United States Patent
Lo et al.

(10) Patent No.: US 9,897,054 B2
(45) Date of Patent: Feb. 20, 2018

(54) CENTRIFUGAL FUEL PUMP WITH VARIABLE PRESSURE CONTROL

(71) Applicant: HONEYWELL INTERNATIONAL INC., Morristown, NJ (US)

(72) Inventors: Charles Lo, Peoria, AZ (US); Dan Laboda, Niles, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 334 days.

(21) Appl. No.: 14/597,938

(22) Filed: Jan. 15, 2015

(65) Prior Publication Data

US 2016/0208759 A1 Jul. 21, 2016

(51) Int. Cl.
| | |
|---|---|
| F02M 59/36 | (2006.01) |
| F04D 29/22 | (2006.01) |
| F04D 31/00 | (2006.01) |
| F02M 59/46 | (2006.01) |
| F04D 17/08 | (2006.01) |
| B64D 37/32 | (2006.01) |

(52) U.S. Cl.
CPC .............. *F02M 59/36* (2013.01); *B64D 37/32* (2013.01); *F02M 59/46* (2013.01); *F04D 17/08* (2013.01); *F04D 29/2277* (2013.01); *F04D 31/00* (2013.01)

(58) Field of Classification Search
CPC ........... F02M 59/36; B64D 37/32; F02C 7/22; F02C 9/39; F04D 29/2288; F04D 29/2266; F04D 7/04; F04D 1/025; F04D 17/105
See application file for complete search history.

(56) References Cited

U.S. PATENT DOCUMENTS

| | | |
|---|---|---|
| 2,575,568 A | 11/1951 | Topanelian, Jr. |
| 3,233,389 A | 2/1966 | Dahlen |
| 3,691,730 A | 3/1972 | Hickey et al. |

(Continued)

FOREIGN PATENT DOCUMENTS

| | | |
|---|---|---|
| AU | 573534 | 8/1983 |
| EP | 0475930 A1 | 3/1992 |

(Continued)

OTHER PUBLICATIONS

EP Search Report for Application No. 15198311.1-1754, dated May 24, 2016.

(Continued)

*Primary Examiner* — Craig Kim
*Assistant Examiner* — Michael Sehn
(74) *Attorney, Agent, or Firm* — Lorenz & Kopf, LLP

(57) ABSTRACT

A fuel flow control system includes a centrifugal pump, a gas inlet valve, and a control. The centrifugal pump has a fuel inlet, a gas inlet, and an outlet. The gas inlet valve is disposed upstream of the gas inlet and is responsive to valve position commands to move between a closed position, in which inert gas is prevented from flowing into the gas inlet, and a plurality of open positions, in which inert gas may flow into the gas inlet. The control is coupled to the gas inlet valve and is configured to supply the valve position commands to the gas inlet valve to command the gas inlet valve to selectively move to the closed position, such that the centrifugal pump is configured to operate as a fuel pump, or any open position, such that the centrifugal pump is configured to operate as a fuel-gas mixer.

14 Claims, 8 Drawing Sheets

(56) References Cited

U.S. PATENT DOCUMENTS

| | | | |
|---|---|---|---|
| 3,663,117 A * | 5/1972 | Warren | B01F 5/16 |
| | | | 261/93 |
| 3,788,039 A | 1/1974 | Bragg | |
| 3,847,298 A | 11/1974 | Hamilton | |
| 3,948,626 A | 4/1976 | Bragg | |
| 4,017,276 A | 4/1977 | Bloem | |
| 4,190,030 A * | 2/1980 | Chester | F02M 19/03 |
| | | | 123/462 |
| 4,890,980 A * | 1/1990 | Heald | F04D 29/2277 |
| | | | 416/181 |
| 4,895,683 A | 1/1990 | Iwasaki | |
| 4,900,335 A | 2/1990 | Algers | |
| 5,061,151 A * | 10/1991 | Steiger | F04D 9/041 |
| | | | 415/106 |
| 5,112,357 A | 5/1992 | Bjerklund et al. | |
| 5,207,734 A | 5/1993 | Day et al. | |
| 5,316,682 A | 5/1994 | Keyser et al. | |
| 5,405,497 A | 4/1995 | Torregrossa | |
| 5,472,567 A | 12/1995 | Torregrossa | |
| 5,522,917 A | 6/1996 | Honda et al. | |
| 5,529,701 A | 6/1996 | Grisham et al. | |
| 5,531,904 A | 7/1996 | Grisham et al. | |
| 5,662,811 A | 9/1997 | Grisham et al. | |
| 5,858,283 A | 1/1999 | Burris | |
| 5,863,031 A | 1/1999 | Veeder et al. | |
| 6,004,386 A | 12/1999 | Grisham et al. | |
| 6,053,249 A | 4/2000 | Stevenson et al. | |
| 6,315,815 B1 | 11/2001 | Spadaccini et al. | |
| 6,423,235 B1 | 7/2002 | Shimoi et al. | |
| 6,431,528 B1 | 8/2002 | Kojima | |
| 6,660,067 B2 | 12/2003 | Stacy et al. | |
| 6,709,492 B1 | 3/2004 | Spadaccini et al. | |
| 6,822,125 B2 | 11/2004 | Lee et al. | |
| 6,830,608 B1 | 12/2004 | Peters | |
| 6,918,949 B1 | 7/2005 | Peters | |
| 6,939,392 B2 | 9/2005 | Huang et al. | |
| 7,093,437 B2 | 8/2006 | Spadaccini et al. | |
| 7,104,530 B2 | 9/2006 | Boye | |
| 7,153,343 B2 | 12/2006 | Burlatsky et al. | |
| 7,186,328 B1 | 3/2007 | Schultz et al. | |
| 7,231,768 B2 | 6/2007 | Spadaccini et al. | |
| 7,260,926 B2 | 8/2007 | Sabatino et al. | |
| 7,264,655 B2 | 9/2007 | Joynson | |
| 7,326,283 B2 | 2/2008 | Gardner et al. | |
| 7,806,966 B2 | 10/2010 | Bose | |
| 7,819,275 B2 | 10/2010 | Stodd et al. | |
| 7,892,321 B2 | 2/2011 | Aagesen et al. | |
| 7,896,232 B1 | 3/2011 | Limaye et al. | |
| 8,221,070 B2 * | 7/2012 | Baryshnikov | F04D 29/2266 |
| | | | 415/104 |
| 8,388,740 B2 | 3/2013 | Sohn et al. | |
| 8,602,362 B2 | 12/2013 | Buchwald | |
| 9,334,109 B1 * | 5/2016 | Mueller | C10G 5/06 |
| 2005/0019623 A1 | 1/2005 | Shoji et al. | |
| 2005/0211096 A1 | 9/2005 | Burlatsky | |
| 2005/0274649 A1 | 12/2005 | Spadaccini | |
| 2006/0113248 A1 | 6/2006 | Koenig et al. | |
| 2006/0169138 A1 | 8/2006 | Schmidt | |
| 2006/0278073 A1 | 12/2006 | McHugh | |
| 2008/0095681 A1 | 4/2008 | Koenig | |
| 2009/0156875 A1 | 6/2009 | Tomioka et al. | |
| 2011/0131870 A1 | 6/2011 | Poirier et al. | |
| 2012/0118154 A1 | 5/2012 | Wu et al. | |
| 2013/0068660 A1 | 3/2013 | Bergeron et al. | |
| 2013/0219914 A1 | 8/2013 | Budge | |

FOREIGN PATENT DOCUMENTS

| | | |
|---|---|---|
| EP | 0645168 B1 | 6/1997 |
| EP | 1958691 A1 | 8/2008 |
| EP | 1579902 B1 | 2/2009 |
| EP | 2631281 A3 | 9/2013 |
| GB | 735866 A | 8/1955 |
| WO | 9402234 | 2/1994 |
| WO | 02/28714 A1 | 4/2002 |
| WO | 03/024582 A1 | 3/2003 |
| WO | 2013110950 | 8/2013 |

OTHER PUBLICATIONS

E.S. Rosa, et al. "The cyclone gas—liquid separator: operation and mechanistic modeling," IEEE Acal Energy Limited, Aug. 1, 2013.

S. Darrah; "Jet Fuel Deoxygenation" DTIC; http://www.dtic.mil/dtic/tr/fulltext/u2/a205006.pdf Oct. 1988.

Patel et al. "Cascade Distillation System" A water recovery system for deep space missions, Jan. 2014, vol. 6, Issue No. 1.

Lo et al. "Fuel Deoxygenation System Contactor-Separator" U.S. Appl. No. 14/539,279, filed Nov. 12, 2014.

Roan, Melissa A. and Andre L. Boehman, "The Effect of Fuel Composition and Dissolved Oxygen on Deposit Formation from Potential JP-900 Basestocks." American Chemical Society, Apr. 13, 2004.

Deuel, Charles L. "Compact Seawater Deoxygenation System Improvements for Floating Production Facilities," SPE International, SPE 74358, Feb. 10-12, 2002.

Vielvoye, Roger, "World's Largest TLP Moves Onto Deepwater Norwegian Location," Oil and Gas Journal, May 4, 1992.

USPTO Notice of Allowance for U.S. Appl. No. 14/539,279 dated Dec. 14, 2016.

USPTO Notice of Allowance for U.S. Appl. No. 14/310,531 dated Nov. 14, 2016.

USPTO Notice of Allowance for U.S. Appl. No. 14/310,531 dated Mar. 2, 2017.

USPTO Notice of Allowance for U.S. Appl. No. 14/539,279 dated Feb. 23, 2017.

USPTO Office Action for U.S. Appl. No. 14/310,531 dated Jun. 30, 2016.

EP Extended Search Report for Application No. 16150501.1-1607, dated Jun. 10, 2016.

USPTO Office Action for U.S. Appl. No. 14/570,152 dated Jul. 20, 2017.

USPTO Notice of Allowance for U.S. Appl. No. 14/570,152 dated Aug. 14, 2017.

* cited by examiner

CENTRIFUGAL FUEL PUMP WITH VARIABLE PRESSURE CONTROL

TECHNICAL FIELD

The present invention generally relates to centrifugal pumps, and more particularly relates to a centrifugal fuel pump with variable pressure control that may be used with, for example, a fuel deoxygenation system.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance increase. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. Several deoxygenation techniques have been developed. However, these often use equipment that is subject to fouling, which can lead to increased maintenance, and/or process steps that are difficult to control. The equipment used for fuel deoxygenation is also implemented separate from the aircraft engine. It would be preferable, therefore, to implement a fuel deoxygenation system as part of an aircraft engine fuel flow control system. It is generally known, however, that fuel deoxygenation systems typically perform better at operating pressures that are lower than some operating modes of an aircraft fuel flow control system. For example, the operating pressures of the fuel supply system may be higher during some non-cruise operations.

It would therefore be desirable to selectively reduce the discharge pressure of one or more fuel pumps within the deoxygenation system during some engine operational modes, while still meeting fuel supply system requirements in other operational modes. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fuel flow control system includes a centrifugal pump, a gas inlet valve, and a control. The centrifugal pump has a fuel inlet, a gas inlet, and an outlet. The gas inlet valve is disposed upstream of the gas inlet and is responsive to valve position commands to move between a closed position, in which inert gas is prevented from flowing into the gas inlet, and a plurality of open positions, in which inert gas may flow into the gas inlet. The control is coupled to the gas inlet valve and is configured to supply the valve position commands to the gas inlet valve to command the gas inlet valve to selectively move to the closed position or one of the plurality of open positions. In the closed position, the centrifugal pump is configured to operate as a fuel pump, and in any one of the plurality of open positions, the centrifugal pump is configured to operate as a fuel-gas mixer.

In another embodiment, a fuel flow control system includes a centrifugal pump, a gas inlet valve, and a control. The centrifugal pump has a fuel inlet, a gas inlet, and an outlet. The centrifugal pump is adapted to receive a drive torque and is configured, upon receipt thereof, to draw fuel into the fuel inlet. The gas inlet valve is disposed upstream of the gas inlet and is responsive to valve position commands to move between a closed position, in which inert gas is prevented from flowing into the gas inlet, and a plurality of open positions, in which inert gas may flow into the gas inlet. The control is coupled to the gas inlet valve and is configured to supply the valve position commands to the gas inlet valve to command the gas inlet valve to selectively move to the closed position or one of the plurality of open positions. When the gas inlet valve is in the closed position, the centrifugal pump is further configured to discharge only fuel from the outlet, and when the gas inlet valve is in an open position, the centrifugal pump is further configured to receive inert gas injected into the gas inlet, mix the fuel and inert gas to produce a fuel-gas mixture, and discharge the fuel-gas mixture from the outlet.

In yet another embodiment, a fuel flow control system includes a centrifugal pump, a gas inlet valve, and a control. The centrifugal pump has a fuel inlet, a gas inlet, and an outlet. The gas inlet valve is disposed upstream of the gas inlet and is responsive to valve position commands to move between a closed position, in which inert gas is prevented from flowing into the gas inlet, and a plurality of open positions, in which inert gas may flow into the gas inlet. The control is coupled to the gas inlet valve and is configured to supply the valve position commands to the gas inlet valve to command the gas inlet valve to selectively move to the closed position or one of the plurality of open positions, to thereby control discharge pressure at the outlet of the centrifugal pump.

Furthermore, other desirable features and characteristics of the centrifugal fuel pump will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
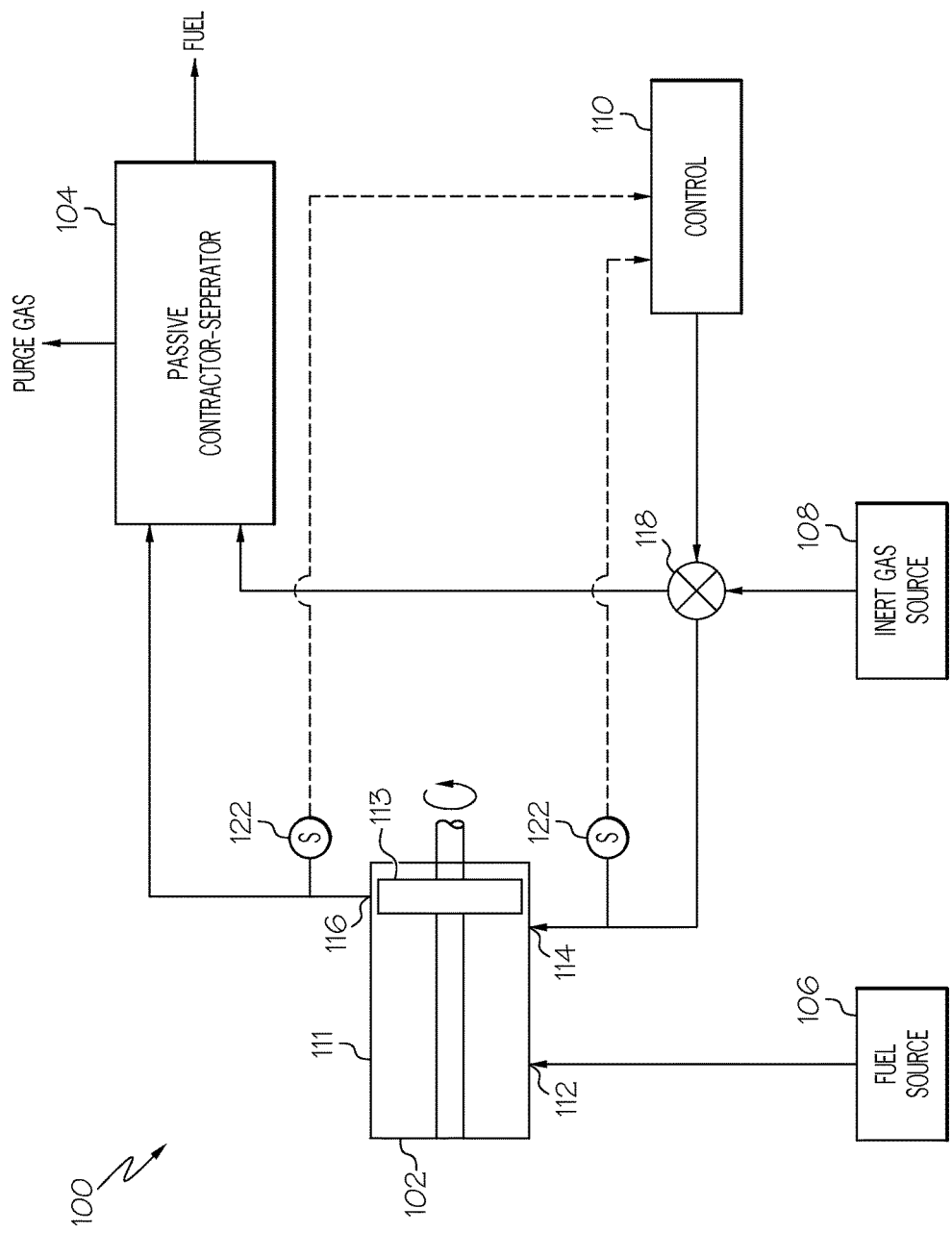
FIG. 1 depicts a simplified schematic representations of a portion of one embodiment of a fuel flow control system.

Referring now to FIG. 1, a simplified schematic representation of only a portion of one embodiment of a gas turbine engine fuel flow control system 100 is depicted. The depicted system 100 includes an integrated fuel deoxygenation system, and may be operated in either a non-deoxygenation mode or a deoxygenation mode. In the non-deoxygenation mode, the system 100 operates as a conventional fuel flow control system. In the deoxygenation mode, however, the system 100 implements the functions of both a fuel deoxygenation system and a conventional fuel flow control system. The depicted system 100 includes at least a boost pump 102, a contactor-separator 104, a fuel source 106, an inert gas source 108, and a control 110.

The boost pump 102 is coupled to receive a drive torque from a non-illustrated torque source, such as a motor or a gas turbine engine. The boost pump 102 is configured, upon receipt of the drive torque, to receive fluid either from only the fuel source 106 or from both the fuel source 106 and the inert gas source 108, and discharge fluid therefrom. When the system 100 is operating in the non-deoxygenation mode, the boost pump 102 is configured to operate as a fuel pump. As such, the boost pump 102 only receives fuel from the fuel source 106, and discharges the fuel. When the system is operating in the deoxygenation mode, the boost pump 102 is configured to operate as a fuel-gas mixer. As such, the boost pump 102 receives fuel from the fuel source 106 and inert gas from the inert gas source 108, uniformly and intimately mixes the fuel and inert gas, and discharges a fuel/gas mixture. A more detailed description of the boost pump 102, and how it is configured to function as either a fuel pump or a fuel-gas mixer, will be provided further below. Before doing so, however, various other of the components depicted in FIG. 1 will be described.

The contactor-separator 104 is coupled to receive the fluid that is discharged from the boost pump 102. As noted above, when the system 100 is operating in the non-deoxygenation mode, the fluid that is discharged from the boost pump 104 is only fuel. In this mode, the fuel supplied from the boost pump 102 merely flows into the contactor-separator 104 and is supplied to other non-illustrated downstream components. However, when the system 100 is operating in the deoxygenation mode, the fluid that is discharged from the boost pump 102 is a fuel/gas mixture. In this mode, the contactor-separator 104 implements the functions of both a contactor and a separator.

Figure 2:
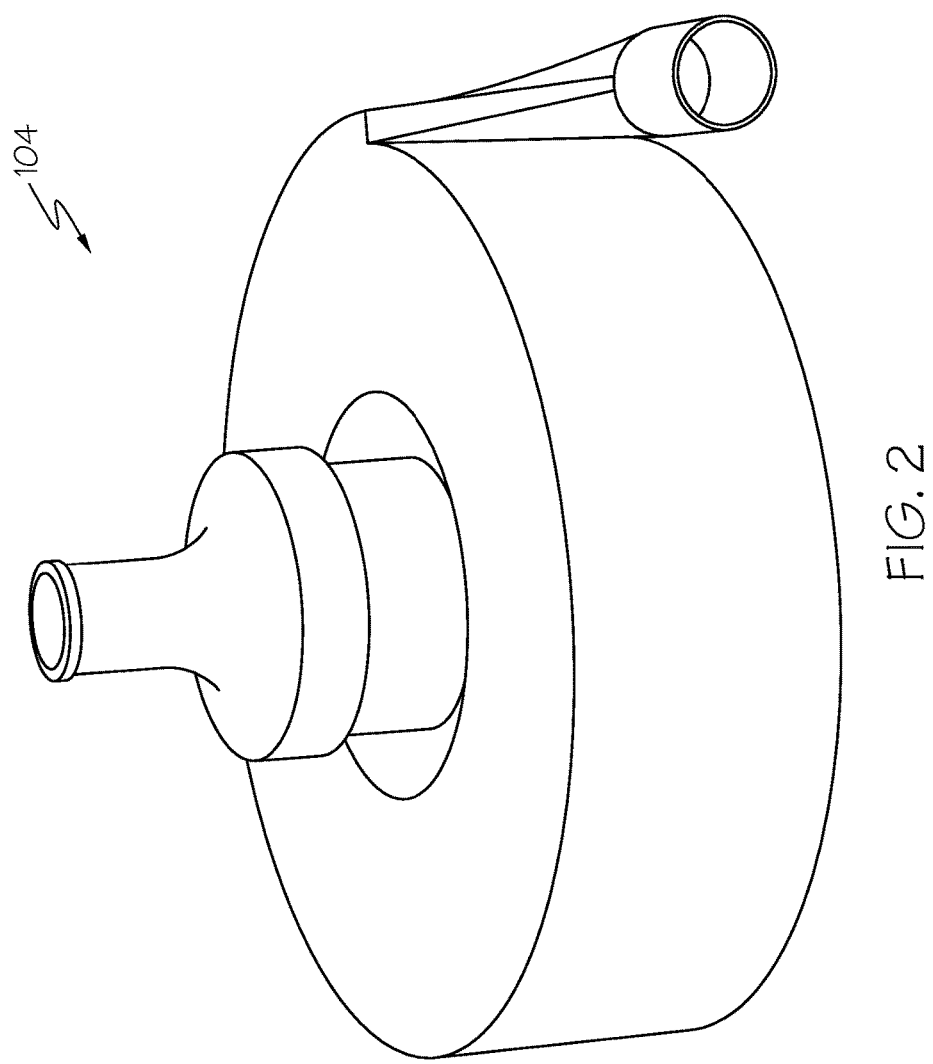
FIGS. 2-4 depict various views of one exemplary embodiment of a contactor-separator that may be used to implement the system of FIG. 1.
Figure 3:
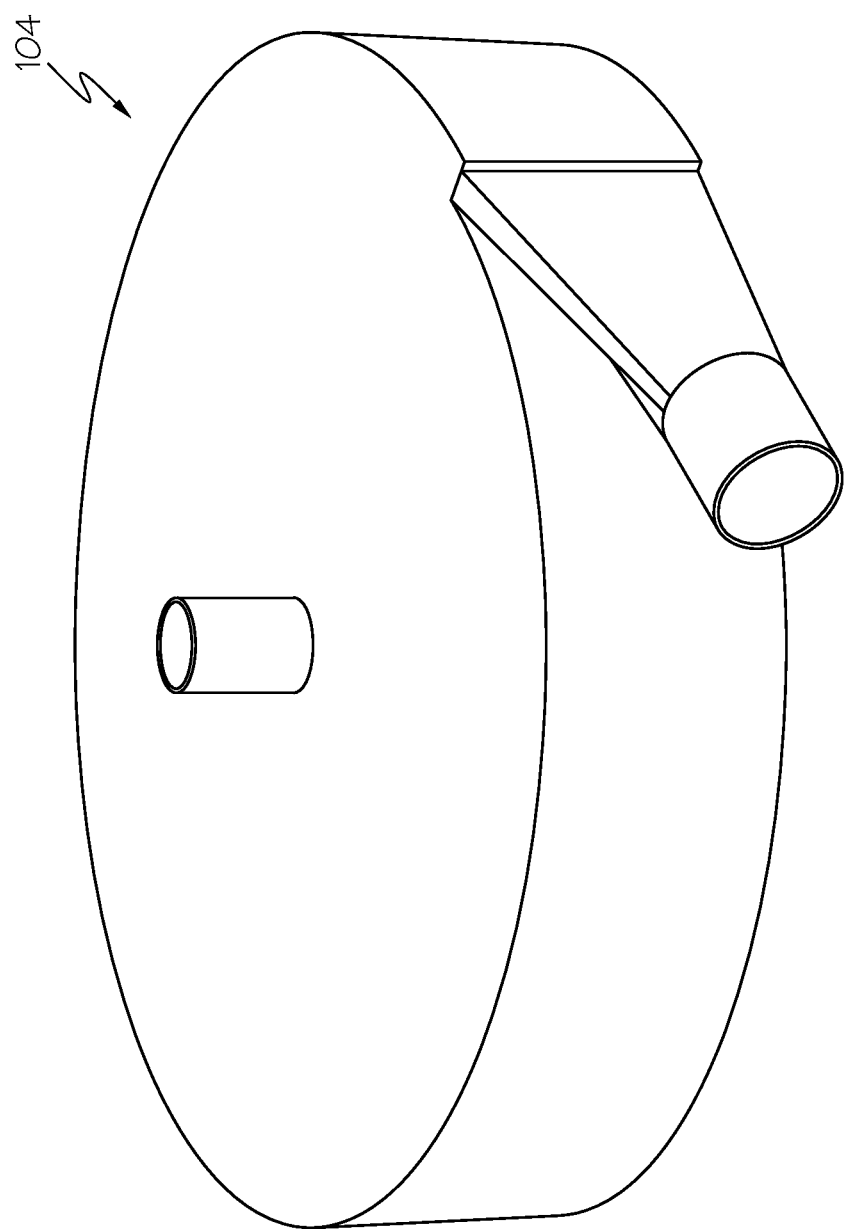
Figure 4:
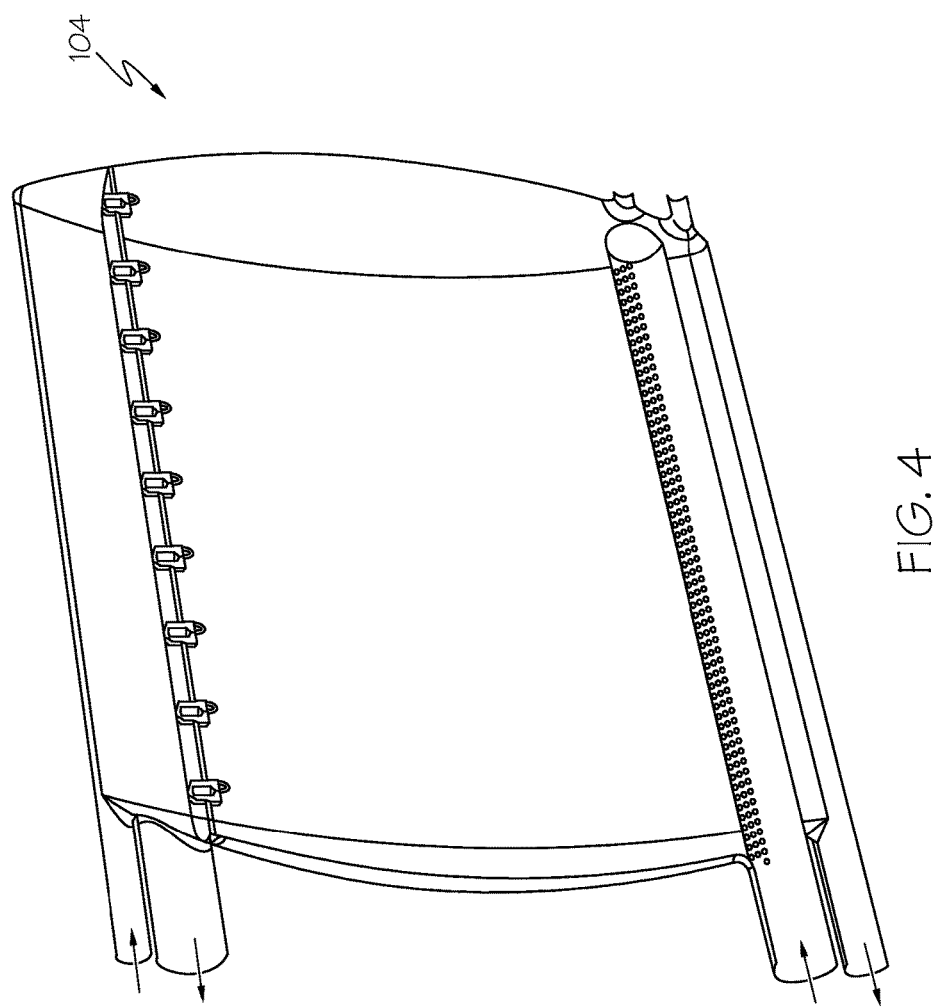

It will be appreciated that the contactor-separator 104 may be variously configured and implemented, but is preferably a passive device. In one embodiment, the passive contactor-separator 104 is configured and implemented using any one of the numerous passive contactor-separators 104 described in co-pending U.S. patent application Ser. No. 14/539,279, filed Nov. 12, 2014, and entitled, "FUEL DEOXYGENATION SYSTEM CONTACTOR-SEPARATOR," or co-pending U.S. patent application Ser. No. 14/570,152, filed Dec. 15, 2014, and entitled, "AIRCRAFT FUEL DEOXYGENATION SYSTEM." The entirety of both of these patent applications is incorporated herein by reference. For completeness, embodiments of the contactor-separators 104 described in these applications are depicted herein in FIGS. 2-4.

It will additionally be appreciated that the fuel source 106 and the inert gas source 108 may be variously configured and implemented. In the depicted embodiment, the fuel source 106 is preferably an onboard aircraft fuel tank that receives and stores fuel for use by various fuel-consuming loads, such as a gas turbine engine. The inert gas source 108 may be a stand-alone source of inert gas, such as an inert gas storage tank or one or more inert gas bottles. Alternatively, the inert gas source 108 may be an inert gas generating system that generates inert gas from, for example, engine bleed air that is selectively supplied from a non-illustrated gas turbine engine. Some non-limiting examples of such systems include one or more of an on-board inert gas generating system (OBIGGS), a pressure swing adsorption (PSA) system, a catalytic reactor, a plurality of membranes, just to name a few. It will be appreciated that the inert gas is preferably nitrogen ($N_2$), but may be one of the other inert gasses.

Before proceeding further, it is noted that the fuel flow control system 100 may, in some embodiments, include one or more other components between the boost pump 102 and the contactor-separator 104. The understanding of these additional components, if included, is not needed to describe or enable the system 100 and will, therefore, not be depicted or described.

Returning once again to FIG. 1, a more detailed description of the boost pump 102, and how it is configured to function as either a fuel pump or a fuel-gas mixer will now be provided. Preferably, the boost pump 102 is implemented as a centrifugal pump, and includes a pump housing 111 and an impeller 113 that is rotationally mounted within the pump housing 111. The pump housing 111 includes a fuel inlet 112, a gas inlet 114, and an outlet 116. The fuel inlet 112 is in fluid communication with the fuel source 106, and the outlet 116 is in fluid communication with the contactor-separator 104. A gas inlet valve 118 is disposed upstream of the gas inlet 114, and is responsive to valve position commands to move between a closed position and a plurality of open position. In the closed position, inert gas is prevented from flowing from the inert gas source 108 into the gas inlet 114. Conversely, in any one of the plurality of open positions, inert gas from the inert gas source 108 may flow into the gas inlet 114.

The control 110 is coupled to, and is configured to supply the valve commands to, the gas inlet valve 118. The control 110 thus commands the gas inlet valve 118 to selectively move to the closed position or one of the open positions. When the gas inlet valve 118 is in the closed position, the system 100 is operating in the non-deoxygenation mode and the boost pump 102 is configured to operate as a fuel pump. As may thus be appreciated, in the non-deoxygenation mode the boost pump 102 is configured, upon receipt of the drive torque, to rotate and draw fuel into the fuel inlet 112 and discharge only fuel from the outlet 116. When the gas inlet valve 118 is in an open position, the system 100 is operating in the deoxygenation mode and the boost pump 102 is configured to operate as a fuel-gas mixer. Thus, in the deoxygenation mode the boost pump 102 is configured, upon receipt of the drive torque, to rotate and draw fuel into the fuel inlet 112 and to receive inert gas injected into the gas inlet 114. The boost pump 102 is further configured to mix the fuel and inert gas to produce a fuel-gas mixture, and to discharge the fuel-gas mixture from the outlet 116.

Figure 5:
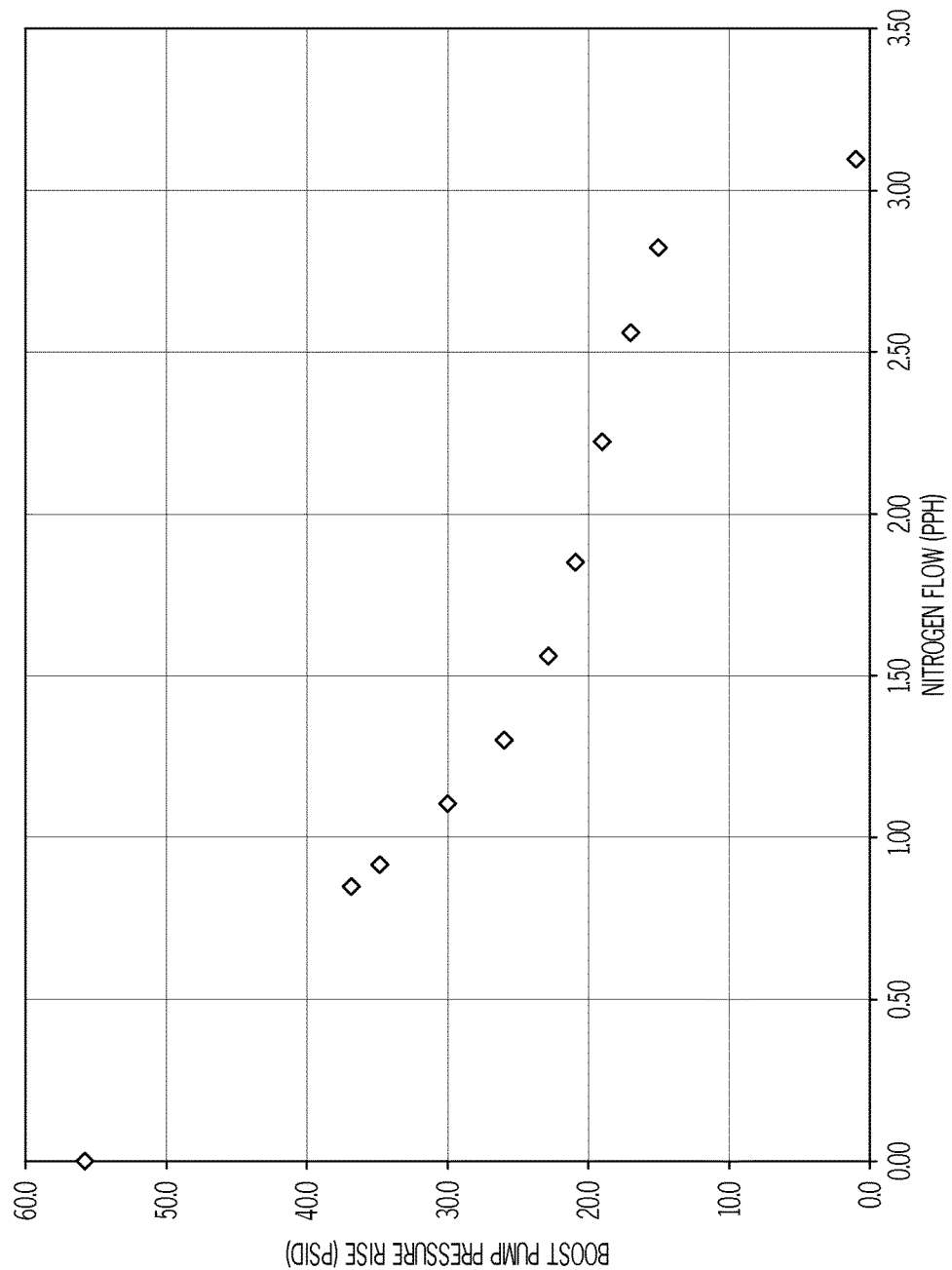
FIG. 5 graphically depicts one example of how pump discharge pressure varies with inert gas flow into the pump.

As may be readily appreciated, the discharge pressure at the outlet 116 of the boost pump 102 will vary with inert gas flow into the gas inlet 114. Thus, in the depicted embodiment, the control 110 is also preferably configured to supply valve commands to modulate the position of the gas inlet valve 118, to thereby control the flow of inert gas into the gas inlet 114, and thus the discharge pressure at the outlet 116 of the boost pump 102. For completeness, one example of the variation in boost pump discharge pressure at the outlet 116 with inert gas flow into the gas inlet 114 is depicted graphically in FIG. 5. It will be appreciated that this is merely exemplary of one particular centrifugal pump, and may vary with other pumps. It will additionally be appreciated that pump discharge pressure versus inert gas flow into the pump will vary depending upon the particular location at which the inert gas is injected into the boost pump 102.

It will additionally be appreciated that the control 110 may be configured to control the position of the gas inlet valve 118, and thus inert gas flow into the gas inlet 114, using any one of numerous control schemes. In this regard, the control 110 may be configured to implement a closed-loop feedback control scheme, in which one or more sensors 122 sense a parameter and supply feedback signals to the control 110. The sensors 122, if included, may vary, and may include one or more of an inert gas flow sensor, a discharge pressure sensor, or both, just to name a few. In other embodiments, the control 110 may be configured to implement a predetermined schedule of boost pump discharge pressure vs. gas inlet valve position.

Figure 7:
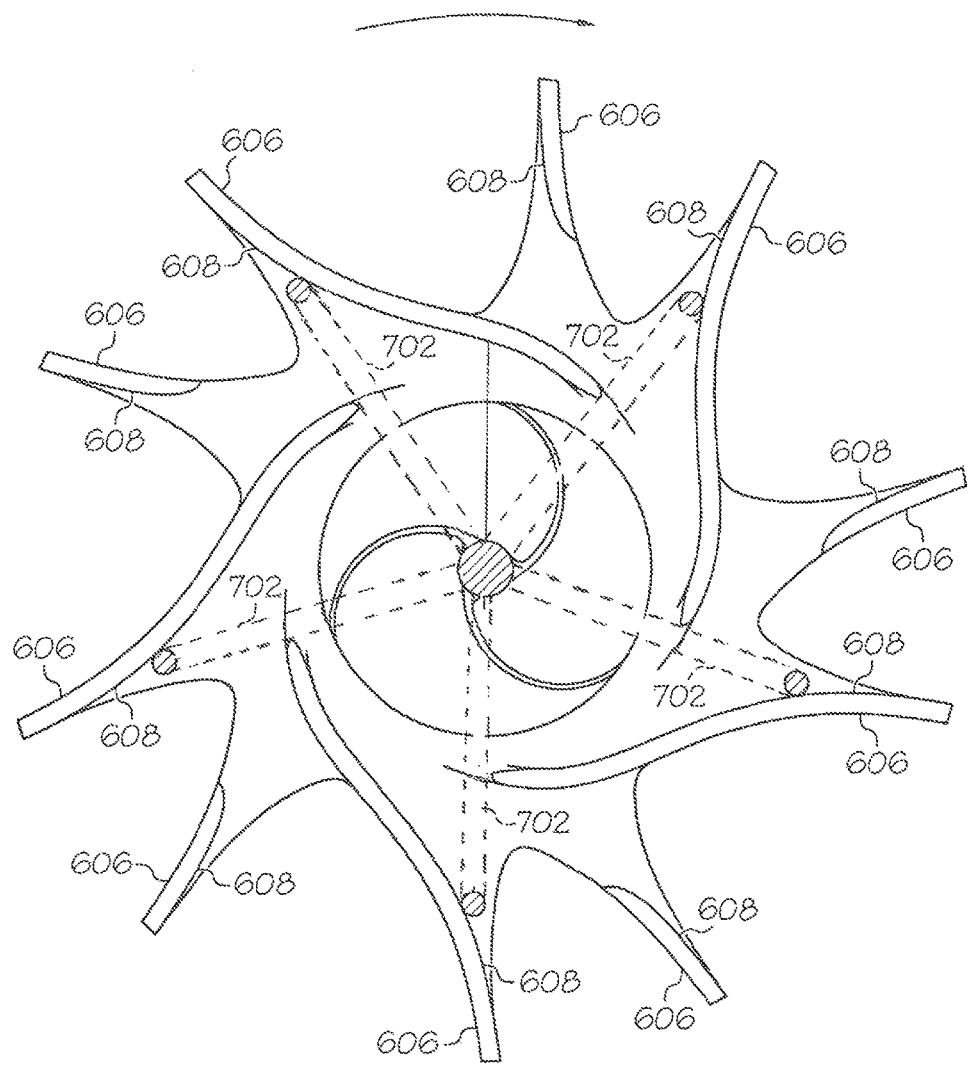
FIG. 7 depicts an end view of another embodiment of a centrifugal pump impeller.
Figure 8:
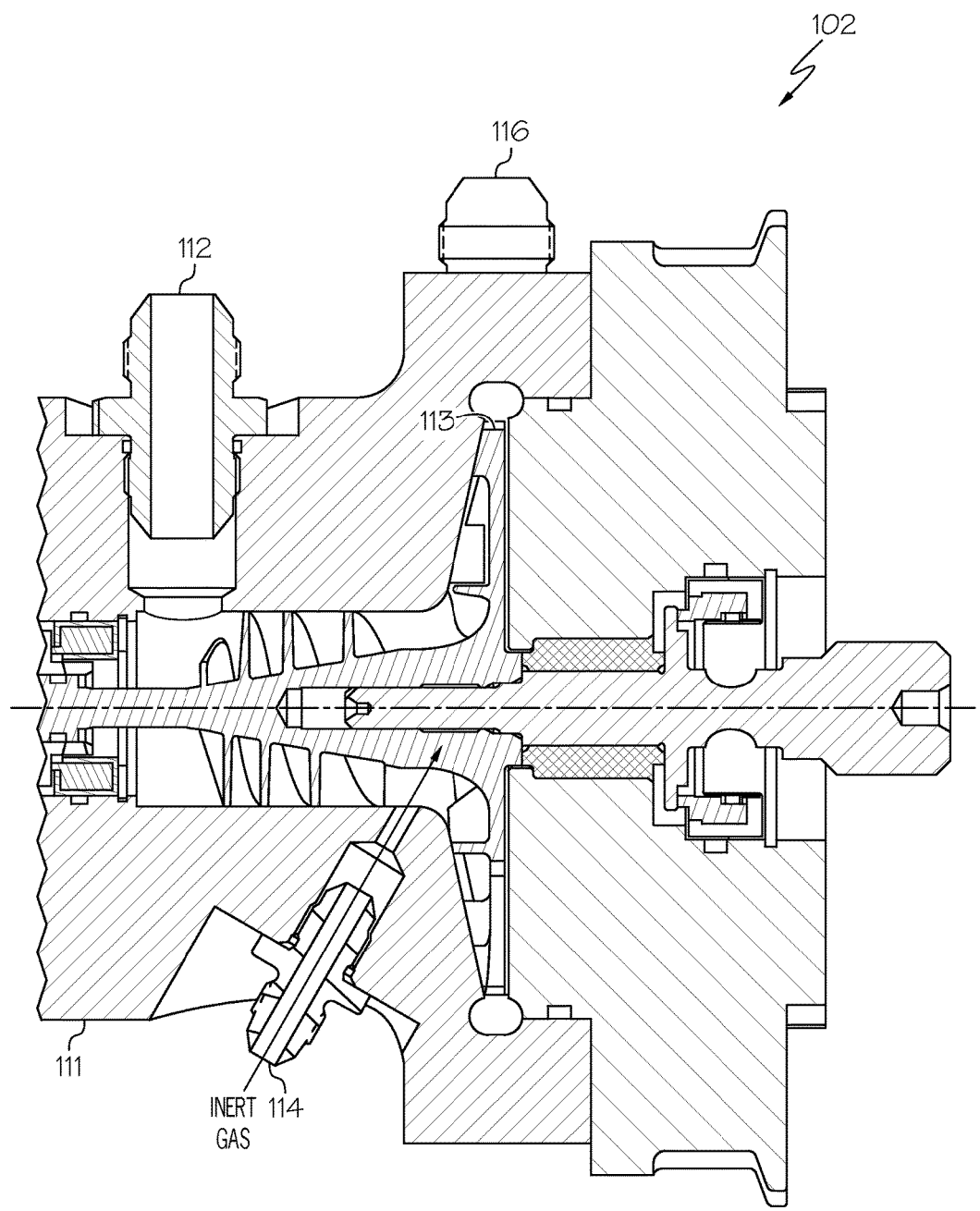
FIG. 8 depicts a cross-section side view of a portion of a centrifugal pump.

Regardless of the particular control scheme that is used, the boost pump 102, and more specifically the gas inlet 114, is preferably configured such that the inert gas that is supplied thereto is discharged into the boost pump 102 between the fuel inlet 112 and the outlet 116. Most preferably, and as FIG. 1 further depicts, the impeller 113 is disposed downstream of the gas inlet 114 so that the inert gas is discharged into the boost pump upstream of the impeller 113. It will be appreciated that this may be accomplished using any one of numerous techniques. Three non-limiting techniques are depicted in FIGS. 6-8, and will now be briefly described.

Figure 6:
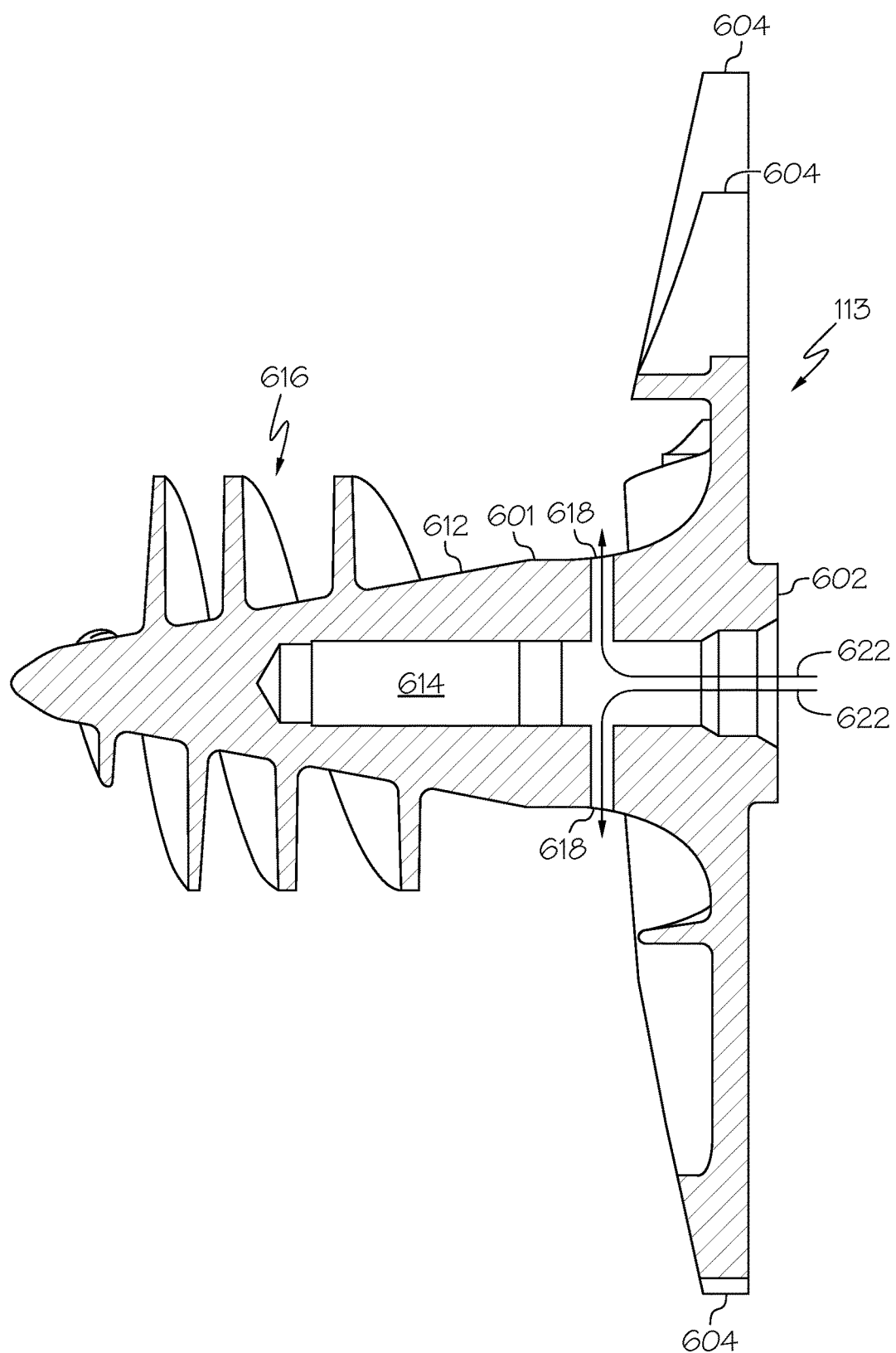
FIG. 6 depicts a cross-section side view of one embodiment of a centrifugal pump impeller.

Referring first to FIG. 6, a cross-section side view of one embodiment of an impeller 113 is depicted. In this embodiment, the impeller 113 is formed on an impeller shaft 601, and includes a central section 602 and a plurality of impeller blades 604. Each impeller blade 604 extends radially away from the central section 602 and, as shown more clearly in FIG. 7, includes a leading edge 606 and a trailing edge 608.

The impeller shaft 601 has an outer surface 612 and a central bore 614 formed therein. The impeller shaft 601 is adapted to receive the drive torque from the drive torque source. As such, it is adapted to couple to a drive shaft that extends from the drive torque source. In the depicted embodiment, an inducer 616 is also formed on the impeller shaft 601, and is disposed upstream of the impeller 113.

As FIG. 6 additionally depicts, a plurality of gas flow channels 618 are formed in the impeller shaft 601 between the central bore 614 and the outer surface 612. Each gas flow channel 618 is disposed between the inducer 616 and the impeller 113 and is in fluid communication with the gas inlet 114 (not depicted in FIG. 6). Preferably, the gas flow channels 618 are disposed near the root of the impeller 113. As such, and as arrows 622 illustrate, when the gas inlet valve 118 is open, inert gas from the gas inlet 114 is directed into the central bore 614, and is discharged from each gas flow channel 618 just upstream of the impeller 113.

Referring now to FIG. 7, which is an end view of the impeller 113, in this embodiment, in addition to or instead of the gas flow channels 618 depicted in FIG. 6, a plurality of internal channels 702 are formed in the impeller 113. Each of these channels 702 is in fluid communication with the gas inlet 114 (not depicted in FIG. 7). Each channel 702 also extends between the central section 602 of the impeller 113 and a trailing edge 608 of a different one of the impeller blades 604.

The third non-limiting technique is depicted in FIG. 8, which depicts a cross-section side view of a portion of the boost pump 102. With this technique, the gas inlet 114 is formed solely in the pump housing 111 and is configured to inject inert gas upstream of the impeller 113, and preferably near the root of the impeller 113, where pressure is at a minimum.

Regardless of the technique that is employed to inject the inert gas, the system 100 described herein may be selectively operated in either a non-deoxygenation mode or a deoxygenation mode. In the deoxygenation mode, boost pump 102 mixes the fuel with inert gas and the pressure rise across the boost pump 102 is controllably reduced. These two functions are performed by forcing the inert gas directly into the boost pump 102, thus reducing its efficiency while using the rotary mixing capability of the impeller 113.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Furthermore, depending on the context, words such as "connect" or "coupled to" used in describing a relationship between different elements do not imply that a direct physical connection must be made between these elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel flow control system, comprising:
 a centrifugal pump having an impeller, a fuel inlet, a gas inlet, and an outlet, the impeller including a central section and a plurality of impeller blades that extend radially away from the central section, each impeller blade including a leading edge and a trailing edge;
 a gas inlet valve disposed upstream of the gas inlet and responsive to valve position commands to move between a closed position, in which inert gas is prevented from flowing into the gas inlet, and a plurality of open positions, in which inert gas may flow into the gas inlet; and a control coupled to the gas inlet valve and configured to supply the valve position commands to the gas inlet valve to command the gas inlet valve to selectively move to the closed position or one of the plurality of open positions, wherein:

the impeller further includes a plurality of internal gas flow channels formed in the impeller, each internal gas flow channel in fluid communication with the gas inlet and including a gas inlet port, a gas outlet port, and a flow passage, each gas inlet port formed in the central section, each gas outlet port formed in the impeller and disposed adjacent a trailing edge of a different impeller blade, each flow passage formed entirely within the impeller and extending between its gas inlet port and its gas outlet port, in the closed position, the centrifugal pump is configured to operate as a fuel pump, in any one of the open positions, the centrifugal pump is configured to operate as a fuel-gas mixer, discharge pressure at the outlet of the centrifugal pump varies with inert gas flow into the gas inlet, and the control is further configured to supply the valve commands to the gas inlet valve to predictably control the discharge pressure at the outlet of the centrifugal pump.

2. The system of claim 1, wherein the centrifugal pump is adapted to receive a drive torque and is configured, upon receipt thereof, to draw fuel into the fuel inlet and:
   (i) when the gas inlet valve is in the closed position, to discharge only fuel from the outlet, and
   (ii) when the gas inlet valve is in any one of the open positions, to receive inert gas injected into the gas inlet, mix the fuel and inert gas to produce a fuel-gas mixture, and discharge the fuel-gas mixture from the outlet.

3. The system of claim 1, wherein the gas inlet is configured such that inert gas supplied thereto is discharged into the centrifugal pump between the fuel inlet and the outlet.

4. The system of claim 1, wherein the centrifugal pump comprises:
   an impeller shaft having a central bore formed therein and an outer surface, the impeller shaft adapted to couple to a drive shaft;
   an impeller formed on the impeller shaft;
   an inducer formed on the impeller shaft and disposed upstream of the impeller; and
   a plurality of gas flow channels formed in the impeller shaft and extending between the central bore and the outer surface, each gas flow channel disposed between the inducer and the impeller and in fluid communication with the gas inlet.

5. The system of claim 1, wherein the centrifugal pump comprises:
   a pump housing having the gas inlet formed therein; and
   an impeller rotationally mounted within the pump housing, the impeller disposed downstream of the gas inlet.

6. A fuel flow control system, comprising:
   a centrifugal pump having an impeller, a fuel inlet, a gas inlet, and an outlet, the impeller including a central section and a plurality of impeller blades that extend radially away from the central section, each impeller blade including a leading edge and a trailing edge, the centrifugal pump adapted to receive a drive torque and configured, upon receipt thereof, to draw fuel into the fuel inlet;
   a gas inlet valve disposed upstream of the gas inlet and responsive to valve position commands to move between a closed position, in which inert gas is prevented from flowing into the gas inlet, and a plurality of open positions, in which inert gas may flow into the gas inlet; and
   a control coupled to the gas inlet valve and configured to supply the valve position commands to the gas inlet valve to command the gas inlet valve to selectively move to the closed position or one of the plurality of open positions, wherein:
   (i) when the gas inlet valve is in the closed position, the centrifugal pump is further configured to discharge only fuel from the outlet,
   (ii) when the gas inlet valve is in any one of the open positions, the centrifugal pump is further configured to receive inert gas injected into the gas inlet, mix the fuel and inert gas to produce a fuel-gas mixture, and discharge the fuel-gas mixture from the outlet,
   the impeller further includes a plurality of internal gas flow channels formed in the impeller, each internal gas flow channel in fluid communication with the gas inlet and including a gas inlet port, a gas outlet port, and a flow passage, each gas inlet port formed in the central section, each gas outlet port formed in the impeller and disposed adjacent a trailing edge of a different impeller blade, each flow passage formed entirely within the impeller and extending between its gas inlet port and its gas outlet port.

7. The system of claim 6, wherein:
   when the gas inlet valve is in the closed position, the centrifugal pump is configured to operate as a fuel pump, and
   when the gas inlet valve is in one of the plurality of open positions, the centrifugal pump is configured to operate as a fuel-gas mixer.

8. The system of claim 6, wherein discharge pressure at the outlet of the centrifugal pump varies with inert gas flow into the gas inlet.

9. The system of claim 8, wherein the control is further configured to supply the valve commands to the gas inlet valve to thereby control the discharge pressure at the outlet of the centrifugal pump.

10. The system of claim 6, wherein the gas inlet is configured such that inert gas supplied thereto is discharged into the centrifugal pump between the fuel inlet and the outlet.

11. The system of claim 6, wherein the centrifugal pump further comprises:
    an impeller shaft having the impeller formed thereon, the impeller shaft further having a central bore formed therein and an outer surface, the impeller shaft adapted to couple to a drive shaft;
    an inducer formed on the impeller shaft and disposed upstream of the impeller; and
    a plurality of gas flow channels formed in the impeller shaft and extending between the central bore and the outer surface, each gas flow channel disposed between the inducer and the impeller and in fluid communication with the gas inlet.

12. The system of claim 6, wherein the centrifugal pump comprises:
    a pump housing having the gas inlet formed therein; and
    an impeller rotationally mounted within the pump housing, the impeller disposed downstream of the gas inlet.

13. A fuel flow control system, comprising:
   a centrifugal pump having a fuel inlet, a gas inlet, and an outlet;
   a gas inlet valve disposed upstream of the gas inlet and responsive to valve position commands to move between a closed position, in which inert gas is prevented from flowing into the gas inlet, and a plurality of open positions, in which inert gas may flow into the gas inlet; and
   a control coupled to the gas inlet valve and configured to supply the valve position commands to the gas inlet valve to command the gas inlet valve to selectively move to the closed position or one of the plurality of open positions, to thereby control discharge pressure at the outlet of the centrifugal pump,
   wherein the centrifugal pump further comprises:
      an impeller shaft having a central bore formed therein and an outer surface, the impeller shaft adapted to couple to a drive shaft,
      an impeller formed on the impeller shaft, the impeller including a central section and a plurality of impeller blades that extend radially away from the central section, each impeller blade including a leading edge and a trailing edge,
      an inducer formed on the impeller shaft and disposed upstream of the impeller,
      a plurality of gas flow channels formed in the impeller shaft and extending radially between the central bore and the outer surface, each gas flow channel disposed between the inducer and the impeller and in fluid communication with the gas inlet, and
      a plurality of internal channels formed in the impeller, each channel in fluid communication with the gas inlet and extending between the central section and a trailing edge of a different impeller blade.

14. The system of claim 13, wherein the centrifugal pump comprises:
   a pump housing having the gas inlet formed therein; and
   an impeller rotationally mounted within the pump housing, the impeller disposed downstream of the gas inlet.

* * * * *